United States Patent [19]
Dobler et al.

[11] 4,448,084
[45] May 15, 1984

[54] NON-CONTACTING SHAFT POSITION SENSOR

[75] Inventors: Klaus Dobler, Gerlingen; Hansjörg Hachtel, Weissach, both of Fed. Rep. of Germany

[73] Assignee: Robert Bosch GmbH, Stuttgart, Fed. Rep. of Germany

[21] Appl. No.: 381,316

[22] Filed: May 24, 1982

[30] Foreign Application Priority Data

Mar. 17, 1982 [DE] Fed. Rep. of Germany ....... 3209623

[51] Int. Cl.³ .............................................. G01L 3/10
[52] U.S. Cl. ................................... 73/862.33; 336/30
[58] Field of Search ....................... 73/862.08, 862.33; 324/208; 336/30, 135

[56] References Cited
U.S. PATENT DOCUMENTS

| | | | |
|---|---|---|---|
| 3,329,012 | 7/1967 | Demuth | 73/862.33 |
| 3,336,525 | 8/1967 | Church | 336/30 X |
| 3,729,991 | 5/1973 | Hardway, Jr. | 73/862.33 |
| 3,823,608 | 7/1974 | Pantermuehl et al. | 73/862.33 |

*Primary Examiner*—Charles A. Ruehl
*Attorney, Agent, or Firm*—Frishauf, Holtz, Goodman & Woodward

[57] ABSTRACT

To improve the output sensitivity of two concentric, telescopic sleeves (8, 9), respectively secured at their end portions to stub shafts (2, 5; 3, 4) which are aligned, and connected, for example, by a torsion element (1), so that torque being transmitted by the shafts through the torsion element can be determined, the sleeves are cut with axial slits (11, 16, 17) in which the cuts of one of the sleeves extend only over half the axial length and are offset with respect to each other, two windings (20, 21) being wound over a winding form (18) surrounding the outer one of the sleeves, and positioned centrally with respect to the half-slits (16, 17); upon applying high-frequency alternating current to the windings, and relative rotation of the sleeves, which will bring one of the half-slits in alignment with the axially extending slit (11) in the other sleeve, while rotating the other half-slit out of alignment, changes in inductance of the windings can be determined due to change in eddy currents being induced in the respective sleeve portions. The width (b) of the conductive sleeve portions (14, 15) to the width (a) of the slits which, effectively, form non-conductive circumferential portions, should be between 10:1 and 5:1, the spacing between the sleeves being as small as possible, for example in the order of 0.05 mm to 0.25 mm.

18 Claims, 4 Drawing Figures

NON-CONTACTING SHAFT POSITION SENSOR

The present invention relates to a sensor for non-contacting determination of angular offset of one shaft with respect to another, for example to determine relative angular rotary position of two shafts, or torsion in axially spaced positions of a shaft, which can be related to torque being transmitted by the shaft.

BACKGROUND

It has previously been proposed to determine the relative position of two shaft elements, which may both be stationary or rotating, with respect to each other by connecting concentric sleeves to respective shaft portions. Upon relative rotation of the respective shaft portions, for example due to torsion of the shaft upon being loaded by transmitting a substantial torque, or the like, the concentric sleeves will rotate with respect to each other. Electrical output signals can be obtained representative of the relative rotation of the sleeves.

The sleeves can be segmentally subdivided, in circumferential direction, into zones of high and low conductivity; they may be made, for example, of brass, bronze, or the like, and the zones of low electrical conductivity can be formed by cut-outs or air gaps in the circumferential portion, which can be left free or filled with a non-conducting material. Electrical current is induced in the sleeves by a winding surrounding the sleeves.

THE INVENTION

It is an object to improve a basic structure of this type to provide a measuring signal which has low drift and high accuracy, so that the system can be used to determine torque being transmitted by a shaft, by relative rotation of axially spaced shaft portions, or the like; and to optimize such a measuring system by a structure which is simple and easy to construct.

Preferably, the zones of conductivity or non-conductivity of the sleeves are so arranged that, measured in circumferential direction, the width b of the sleeves where they have high conductivity is about 5 to 10 times the width a of the zones of low conductivity.

In accordance with a feature of the invention, two sleeves are provided, one each located within the other when finally assembled to the respective shaft portions. Axially extending slots are then cut in the respective sleeves to thereby form the zones or regions of low conductivity, the slots having a width which is between 1/5 to 1/10 of the circumferential extent of the sleeve portions between the slots, so that the ratio of the dimension b, in circumferential direction, of the zones of high conductivity with respect to the width a of the zones of low conductivity is between 10:1 to 5:1.

DRAWINGS

The invention will be described in connection with a sensor to determine torque in a shaft or relative rotary position of two shaft elements, applied to a torsion bar 1.

Figure 1:
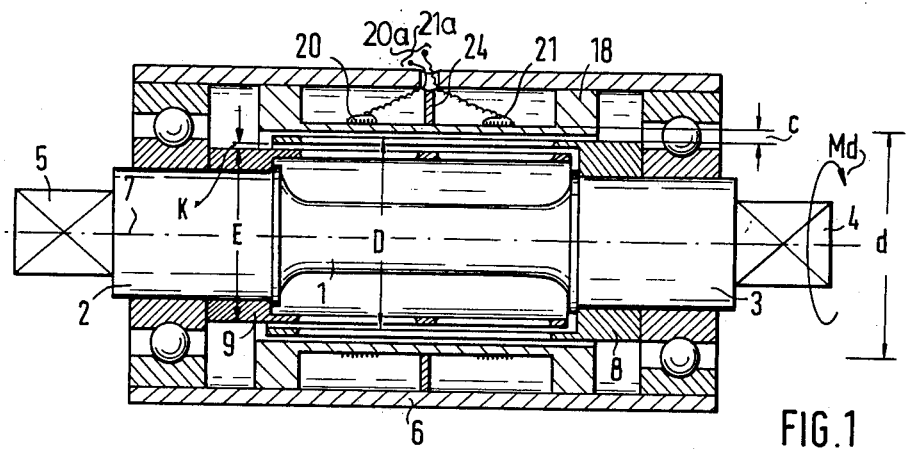
FIG. 1 is an axial cross section through the sensor.

The torsion bar 1 is located between two shaft stubs 2, 3 and is subjected to torque. Upon applying a torque $M_d$ to the shaft stub 3, for example on a square socket connector 4, and restraining the shaft stub 2, for example by clamping a square socket connector 5, relative rotation over a very small angle will occur between the shaft stubs 2 and 3. FIG. 1 assumes that a torque $M_d$, towards the right, is applied to the socket connector 4 at the right-hand stub 3, the socket connector 5 at the left-hand stub 2 being clamped, so that a counter torque will be generated therein.

The measuring system to determine the torque $M_d$ is positioned within a tubular housing 6, retained and positioned by suitable ball bearings, which includes two concentric sleeves 8, 9, which are concentric with respect to a common longitudinal axis 7. The inner sleeve 9, as well as the outer sleeve 8, are made of electrically highly conductive material, preferably non-magnetic, for example having about 1 mm wall thickness. The outer sleeve 8 is secured by a spacer portion 8a to the stub shaft 3 to rotate therewith, while preventing relative rotation between stub shaft 3 and the spacer portion 8a and hence the sleeve 8. The inner sleeve 9 is similarly secured by a spacer 9a on the stub shaft 2. The outer sleeve 8 is shown in a longitudinal sectional view in greater detail in FIG. 3. It has a clearance diameter B, an end connecting portion 8a, and is formed along its circumference with eight uniformly distributed circumferential slits 11. The slits 11 are parallel to the axis 7, and are cut into the wall of the sleeve 8 by a milling cutter, by sawing, or the like. They extend axially close to the end zones 12, 13 of the sleeve 8. A circumferential surface portion 14 will remain of the sleeve between the respective slits 11. Thus, as far as the circumference of the sleeve is concerned, the electrical conductivity of the zones 11 will be substantially less—effectively zero—than the conductivity of the zones 14, which corresponds to that of the material of which the sleeves are made.

Figure 2:
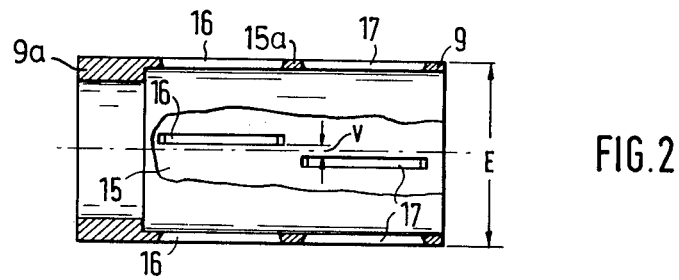
FIG. 2 is an axial cross section, partly cut away, through the inner one of the sleeves.
Figure 3:
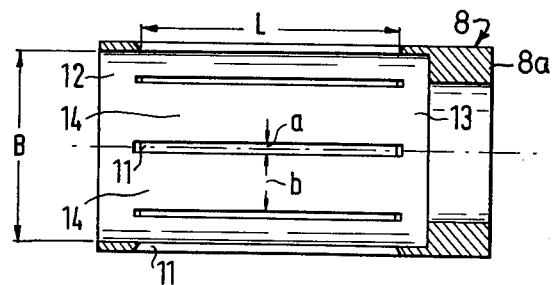
FIG. 3 is an axial cross section through the outer one of the sleeves.

The inner sleeve 9 is shown in axial sectional view in FIG. 2. Sleeve 9 has an outer diameter (OD) E; the circumferential surface is cut by slits 16 to subdivide the surface in eight circumferentially continuous zones 15, which are congruent with the circumferential zones 14 of the outer sleeve 8 (FIG. 3). In contrast to the outer sleeve, the slits are formed in two groups 16, 17. A slit pair 16, 17, each, is so arranged that the respective slits 16, 17 are offset circumferentially by a distance v. The distance v corresponds approximately to the width of a slit. Slits 11, as well as the slits 16, 17, and the offset v, are about 1 mm wide. The axial length of the slits 16, 17 is about half the axial length of the associated slit 11 (FIG. 3), leaving a small continuous central strip 15a. The length of the slits 11 (FIG. 3) is shown at L; the length of the slits 16, 17 is roughly ½ L.

Figure 4:
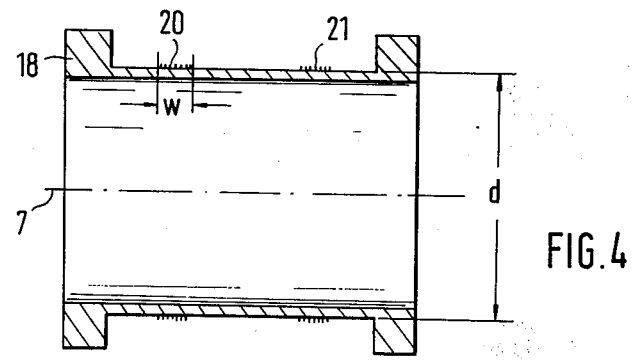
FIG. 4 is an axial cross section of the winding form or carrier.

A cylindrical spool form or spool carrier 18 (FIG. 4), of insulating material, is positioned in the region of coverage of the inner and outer sleeves 9, 8. Two separate single-layer windings 20, 21, each of a width W, are wound on the form 18. The outer diameter of the form 18, forming the winding diameter of the windings 20, 21, is shown at d. The width W of the respective windings 20, 21 is a fraction of the axial length L of the surface region interrupted by the slits 11 (FIG. 3); preferably, the width W of any one of the coils 20, 21 is less than ⅓ L.

At least one of the two sleeves 8, 9, and preferably both, are made on non-ferrous material, such as brass or bronze, or copper alloy. The windings 20, 21 are so positioned that they are approximately centrally located with respect to the half-slits 16, 17 of sleeve 9 (FIG. 2), to cover the central region of the half-slits over a narrow width thereof. In operation, high frequency alternating current is connected to the windings, which can be separately connected by connecting leads 20a, 27a (FIG. 1).

Operation: By using two windings 20, 21, a differential measuring system can be used. Upon application of a torque Md to the stub shaft 3, and clamping the stub shaft 2, sleeve 8 will be rotated with respect to sleeve 9. One of the sleeves 16, 17 will be twisted out of partial-or at least edge-alignment with the sleeve 11, whereas the other one of the half-slits of sleeve 9 (FIG. 2) will be twisted into increasing congruence with the slit 11. Thus, in one of the windings 20, 21 the inductance will decrease whereas, in the other, the inductance will increase due to increased eddy current generation in the inner sleeve or, respectively, decreased occurrence of eddy currents (upon congruence of slit positions). Consequently, the differential change in inductance can be measured by connecting, for example, the coils 20, 21 in a bridge circuit or to another inductance measuring device. The two coils 20, 21 could, also, be individually connected, for example to different arms of a bridge.

High sensitivity of the measuring device is obtained by keeping the radial distance c (FIG. 1) between the inner diameter d of the windings 20, 21 and the outer diameter D of the outer sleeve 8 as small as possible. In accordance with a feature of the invention, this distance should be in the order of 1 to 1.5 mm; smaller distances are preferred, but difficult to obtain in actual constructions. The width b of the zones of high conductivity between the slits is about ten times the width of the slits, forming zones of low or, effectively, zero conductivity. The width b is measured in circumferential direction along the surfaces 14 of sleeve 8 (FIG. 3) and 15 of sleeve 9 (FIG. 2), so that the zones of low conductivity between the slits 11 (FIG. 3) and, respectively, 16 and 17 (FIG. 2), respectively, which have no conductivity, will be about ten times as great.

The effectiveness of differential measuring is improved by providing a shield ring 24, of conductive material, preferably of non-magnetic, or non-ferrous metal such as copper, copper-containing metal such as brass or the like, or aluminum, is positioned between the coils to form a shielding element therebetween and prevent inductive cross-coupling.

The spacing K between the outer diameter (OD) E of the inner sleeve 9 and the inner diameter (ID) B of the outer sleeve 8 should be as small as possible, and, preferably, a fraction of a millimeter; spacings between 0.05 to 0.25 mm are preferred. Such spacings can be obtained by making the sleeves of copper-containing metal, such as brass, bronze of the like, or of aluminum, in order to obtain circumferential surface areas 14 in sleeve 8 and 15 in sleeve 9 which have high conductivity, subdivided by the slits which have, effectively, zero conductivity. The shield ring 24 is preferably located in a plane of symmetry extending transversely to the axis 7 of the shafts stubs 2, 3.

The present invention is a further development of the invention of our application 06/213 589, filed Dec. 5, 1980, now U.S. Pat. No. 4,356,732 Nov. 2, 1982, the disclosure of which is hereby incorporated by reference.

We claim:

1. Non-contacting relative shaft position sensor for determination of the relative position or rotation of a first shaft element (2, 5) with respect to a second shaft element (3, 4) axially aligned with the first shaft element, and relatively angularly shiftable with respect thereto, having
   a first sleeve (9) secured to the first shaft, surrounding said shaft over a portion of its axial length, and rotatable therewith;
   a second sleeve (8) secured to the second shaft and rotatable therewith, concentric with the first sleeve and telescopically extending thereover, said first and second sleeves being relatively rotatable with respect to each other upon relative twist or rotation of said shaft elements;
   means (11, 16, 17) for subdividing the circumferences of said sleeves into essentially part-cylindrical segments or portions (14, 15) of alternating high electrical conductivity (14, 15) and low electrical conductivity (11, 16, 17);
   and an exciter winding means (20, 21) positioned for coupling high-frequency currents to said sleeves and inducing eddy currents in said sleeves,
   and wherein,
   the ratio of the circumferential length (b) of the part-cylindrical segment or portion of high-conductivity (14, 15) with respect to the circumferential length (a) of the portion of low conductivity (11, 16, 17) is between about 10:1 and 5:1.

2. Sensor according to claim 1, wherein the eddy current inducing means comprises a circumferential winding (20, 21) coaxially circumferentially surrounding the outer one (8) of said sleeves;
   and wherein the radial distance (c) between the inner diameter (d) of the winding (20, 21) and the outer diameter (D) of the outer sleeve is in the order of between 1 mm to 1.5 mm.

3. Sensor according to claim 1, wherein the radial distance (K) between the inner diameter (B) of the outer one of said sleeves (8) and the outer diameter (E) of the inner one of said sleeves (9) is in the order of between about 0.05 mm to 0.25 mm.

4. Sensor according to claim 1, further including a winding form or carrier (18) of insulating material surrounding the outer one of said sleeves (8) and having an outer diameter, on which said winding is applied, which is positioned close to the outer surface of the outer one of said sleeves (8).

5. Sensor according to claim 1, wherein said winding means comprises a winding extending in axial direction by up to ⅓ the axial length (L) of the portion of low conductivity.

6. Sensor according to claim 5, wherein the winding (20/21) is located symmetrically with respect to the center position of the slits (11, 16, 17) and at least approximately within the center region thereof.

7. Sensor according to claim 1, wherein at least one of said sleeves is made of non-ferrous metal;
   and wherein the circumferential portions of low conductivity comprise axially extending slits (11, 16, 17) axially extending up to, but short of, the axial end portions (12, 13) of the sleeves.

8. Sensor according to claim 7, wherein said sleeves are cylincrical elements with the slits milled or cut therein, extending parallel to the axis (7) of said aligned shaft elements (2, 3).

9. Sensor according to claim 7, wherein one of said sleeves (8) is formed with a group of slits (11) extending continuously over the axial length of said sleeve just short of said end portions (12, 13);

and wherein the other one of said sleeves (9) is formed with slits (16, 17) extending from the end portions of the respective sleeve to a central portion and terminating at the central portion, the respective slits extending from opposite end portions being circumferentially offset by a distance (v) which is at least approximately the same as the width of the respective slits (16, 17).

10. Sensor according to claim 9, wherein the respectively offset slits (16, 17) have a length which is approximately half the axial length as the associated slit (11) in the other sleeve (8) extending continuously through the central region thereof.

11. Sensor according to claim 10, wherein said axially offset half-slits (16, 17) are located in the inner one (9) of the telescopically arranged sleeves;

and wherein the half-slits are located in respectively axially staggered portions of the sleeve extending axially from a central position of the sleeves in their telescopic overlapping range.

12. Sensor according to claim 9, wherein the winding means comprises two windings (20, 21), each located approximately centrally with respect to the axial extent of the half-slits (16, 17) which are circumferentially offset with respect to each other.

13. Sensor according to claim 12, further including a ring-like shielding element (24) extending radially between the windings (20, 21).

14. Sensor according to claim 13, wherein said radially extending shielding ring element is positioned in a plane transverse to the axis (7) of said shaft elements and forming a plane of symmetry.

15. Sensor according to claim 13, wherein the ring-like shielding element comprises a shielding ring of non-ferrous metal.

16. Sensor according to claim 7, wherein the width (a) of the slits is in the order of about 1 mm.

17. Sensor according to claim 7, wherein the winding means comprises two windings (20, 21) positioned, respectively, approximately centrally with respect to the axial extent of the half-slits (16, 17).

18. Non-contacting relative shaft position sensor for determination of the relative position or rotation of a first shaft element (2, 5) with respect to a second shaft element (3, 4) axially aligned with the first shaft element, and relatively angularly shiftable with respect thereto, having a first sleeve (9) secured to the first shaft, surrounding said shaft over a portion of its axial length, and rotatable therewith;

a second sleeve (8) secured to the second shaft and rotatable therewith, concentric with the first sleeve and telescopically extending thereover, said first and second sleeves being relatively rotatable with respect to each other upon relative twist or rotation of said shaft elements;

means (11, 16, 17) for subdividing the circumferences of said sleeves into essentially part-cylindrical segments or portions (14, 15) of alternating high electrical conductivity (14, 15) and low electrical conductivity (11, 16, 17);

and an exciter winding means (20, 21) positioned for coupling high-frequency currents to said sleeves and inducing eddy currents in said sleeves.

* * * * *